Nov. 21, 1950     G. MILLER     2,530,897
NONSKID TRACTION CLEAT
Filed June 24, 1949
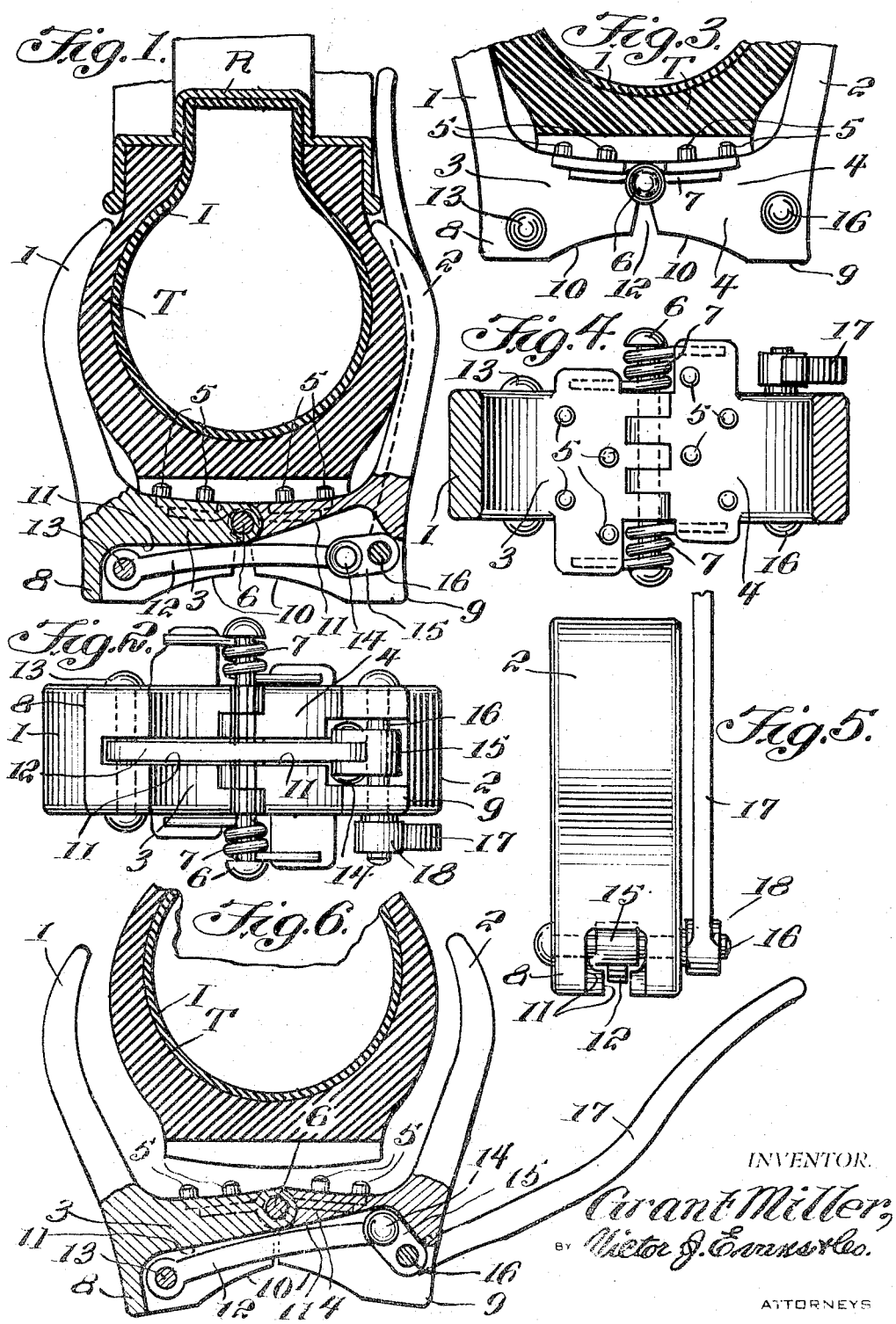
INVENTOR.
Grant Miller,
BY Victor J. Evans & Co.
ATTORNEYS Patented Nov. 21, 1950

2,530,897

UNITED STATES PATENT OFFICE 2,530,897

NONSKID TRACTION CLEAT

Grant Miller, Washington, D. C.

Application June 24, 1949, Serial No. 101,133

4 Claims. (Cl. 152—225)

My present invention relates to the general class of pneumatic or resilient tires for automotive vehicle wheels and more particularly to an improved non-skid traction cleat or deformable ground engaging traction device that may readily be mounted for emergency use with pneumatic tires in extracting an automotive vehicle from stalled position in snow, ice, mud, or other unfavorable conditions. The primary purpose of the invention is the provision of a non-skid traction cleat, one or more of which may readily be mounted on and transversely of a wheel tire, and which may with equal facility quickly be detached when not required for use.

The cleat includes a pair of opposed jaws for enclosing the side walls of a tire and resilient means are provided for clasping the jaws on the tire, together with a manually operated toggle lock for rigidly clamping the jaws on the side walls of the tire to prevent forcible displacement of the cleat as by centrifugal force created by a spinning wheel in an attempt to extricate a stalled automotive vehicle.

The novel ground engaging cleat includes a minimum number of parts that may with facility be manufactured at low cost of production, and the parts may be manipulated with convenience for mounting and dismounting the cleat; and the invention consists in certain novel features of construction and combinations of these parts as will hereinafter be described and more particularly set forth in the appended claims.

In the accompanying drawings I have illustrated a complete example of a physical embodiment of my invention in which the parts are combined and arranged in accord with one mode I have devised for the practical application of the principles of the invention. It will however be understood that changes and alterations are contemplated and may be made in these exemplifying drawings and mechanical structures, within the scope of my claims, without departing from the principles of the invention.

Figure 1 is a sectional view through an automotive vehicle wheel, showing the cleat in section and rigidly clamped on the tire; and Figure 2 is a bottom plan view of the traction cleat.

Figure 3 is a fragmentary view showing a portion of the cleat in elevation; and Figure 4 is a horizontal sectional view of the closed cleat.

Figure 5 is an edge elevation of the cleat; and Figure 6 is a view similar to Figure 1, with the jaws in unlocked position to permit removal of the cleat from the tire.

For extricating a stalled automobile, one or two of the wheels are equipped with one or more of the non-skid cleats, and in order that the general relation and utility of the cleats may readily be understood I have shown in the assembly views a portion of a vehicle wheel having a pneumatic tire T and its inner tube I, together with the usual metallic rim R of the wheel.

The cleat, which is of general U-shape, includes a pair of opposed clamping jaws 1 and 2 of comparatively light metal that are curved to conform to the exterior lines of the tire T, and each jaw has an integral and angular bearing plate or hinge plate as 3 and 4. These plates have inner tread faces curved to conform to the tread surface of the tire, and short retaining pins 5 projecting from these faces are adapted to enter the tread cavities of the tire to assist in holding the cleat in place on the tire.

The tread plates 3 and 4 are hinged on a transversely arranged hinge pin 6, headed at both ends, and a pair of spaced springs 7, 7, are coiled about the end portions of the pin, with their ends seated in sockets of the two plates, to hold the jaws against outspreading movement, as well as to clasp the jaws with resilient force against the side walls of the tire.

On their outer faces these tread plates form ground engaging bases or feet as 8 and 9, and the plates are curved or arched, as at 10, to separate the bases or lugs and these ground engaging lugs form fulcrums for the jaws. Thus when the weight of the load is imposed against the inner tread faces of the two plates, the hinge joint is flexed, the base lugs 8 and 9 form fulcrums, and the jaws clamp the outer side walls of the tire, as the cleat revolves with the tire and wheel.

For rigidly and constantly clamping the jaws against the opposite sides of the tire, to prevent forcible displacement of the cleat, as when the wheel and tire are spinning, a manually operated toggle-lock of the quick acting type is mounted on the cleat. To accommodate the toggle lock, the outer faces of the two tread plates are slotted transversely, as at 11, and a link 12 is mounted in the slot with one end pivoted at 13 in the ground engaging tread lug 8, while the other end of the link is pivoted at 14 on a rock arm or lever arm 15 that is rigidly fixed on a rock pin 16 journaled in bearings of the tread lug 9.

A hand lever 17 located at one side of the cleat is fixed at 18 on the rock pin 16, and it will be apparent that as the lever is pushed to position on Fig. 1 against the side of the tire, pin 14 is depressed across the center line between pins 13 and 16, to lock the jaws on the tire. For releasing the jaws, the hand lever is swung away from the tire as in Fig. 6, pin 14 snaps across the center line between pins 13 and 16, to spread the jaws, and the springs 7, 7, prevent excessive spreading movement of the jaws.

Having thus fully described my invention, what I claim as new and desire to secure by Letters Patent is:

1. In a detachable traction cleat for use on a wheel tire, the combination with a pair of opposed clamping jaws having tread plates, and a central joint between said plates, of ground-engaging lugs integral with the plates and adapted to form fulcrums for the jaws, a toggle-lock for the jaws mounted in the tread plates, and a lever for manually operating the toggle lock.

2. In a detachable traction cleat for use on a wheel tire, the combination with a pair of opposed clamping jaws having tread plates, a hinge joint between said plates, ground engaging lugs integral with the plates adapted to form fulcrums for the jaws, and resilient means tending to close said jaws, of a toggle lock for the jaws mounted in a slot of the tread plates, and a lever for manually operating the toggle lock.

3. In a detachable traction cleat for use with a wheel tire, the combination with a pair of opposed clamping jaws having slotted tread plates, a hinge joint between said plates, and spaced ground engaging lugs integral with the plates forming fulcrums for the jaws, of a toggle link having one end pivotally mounted in one tread plate, a rocking pin journaled in the other tread plate, a lever arm rigid with the rocking pin and pivotally connected to the link, and a manually operated lever mounted on the rocking pin.

4. In a detachable traction cleat for use with a wheel tire, the combination with a pair of opposed clamping jaws having slotted tread plates and tire-engaging retaining pins on said plates, a hinged joint between the plates and springs coacting with the hinge joint tending to close the jaws, and spaced ground engaging lugs integral with the tread plates forming fulcrums for the jaws, of a toggle link having one end pivotally mounted in one tread plate, a rocking pin journaled in the other tread plate, a lever arm rigid with the rocking pin and pivotally connected to the link, and a manually operated lever mounted on the rocking pin.

GRANT MILLER.

REFERENCES CITED

The following references are of record in the file of this patent:

UNITED STATES PATENTS

| Number | Name | Date |
|---|---|---|
| 1,499,036 | Smith | June 24, 1924 |
| 2,445,947 | Hoppes | July 27, 1948 |